(12) United States Patent
Chen

(10) Patent No.: US 7,416,299 B2
(45) Date of Patent: Aug. 26, 2008

(54) TOOL-FREE ADJUSTABLE NOSE PAD ASSEMBLY OF EYEGLASSES

(76) Inventor: Joy Chen, No. 24, Lane 420, Sec. 1, Chien Kang Rd., Tainan (TW)

( * ) Notice: Subject to any disclaimer, the term of this patent is extended or adjusted under 35 U.S.C. 154(b) by 95 days.

(21) Appl. No.: 11/623,084

(22) Filed: Jan. 14, 2007

(65) Prior Publication Data

US 2008/0170200 A1 Jul. 17, 2008

(51) Int. Cl.
*G02C 5/12* (2006.01)
(52) U.S. Cl. ........................... 351/136; 351/138
(58) Field of Classification Search ............ 351/41, 351/78–82, 136–139
See application file for complete search history.

(56) References Cited

U.S. PATENT DOCUMENTS 4,732,464 A * 3/1988 Bononi ..................... 351/88

6,422,699 B2 * 7/2002 Kobayashi ................ 351/136

\* cited by examiner

*Primary Examiner*—Huy K Mai
(74) *Attorney, Agent, or Firm*—Banger Shia

(57) ABSTRACT

A nose pad assembly applicable to all types of eyeglasses is provided, which includes an eyeglasses mainframe, and a nose pad structure. The eyeglasses mainframe includes in its center a nose rack with a trough sleeve on either end for accommodating the nose pad structure. The trough sleeve includes a hook-wall, a center groove, a peripheral groove, and an upholding opening with a smaller opening on the side facing outwards than on the side contacting the nose rack. The center groove joins the peripheral groove at the delimiting edge. The nose pad structure includes a nose pad mainframe flanked on each side with an insertion base, which connects an insertion piece. Each insertion piece includes an insertion wedge and an insertion pillar with a protruding rim for firmly secured inside the trough sleeve against the delimiting edge.

4 Claims, 8 Drawing Sheets

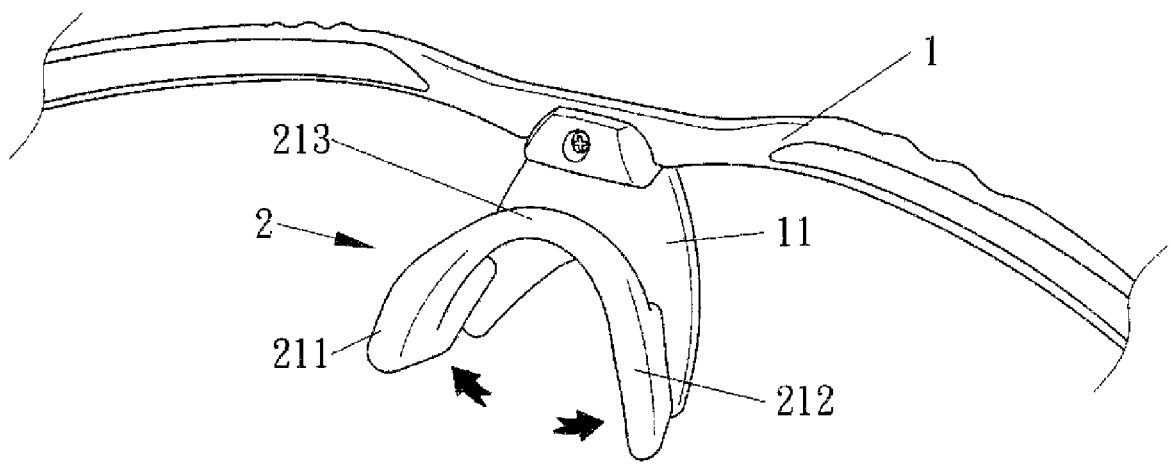
F I G . 5

TOOL-FREE ADJUSTABLE NOSE PAD ASSEMBLY OF EYEGLASSES

BACKGROUND OF THE INVENTION

1. Field of the Invention

This invention relates to a nose pad assembly of eyeglasses and, more particularly, to a nose pad assembly of eyeglasses that can be conveniently installed, easily replaced, and also firmly secured in place without using assembly tools.

2. Description of the Related Art

Most conventional nose pads for eyeglasses are composed of three essential elements: a nose rack, a fastener with an insertion head, and a nose pad with an open hole, as disclosed in U.S. Pat. Nos. 6,079,825 and 6,793,337. The fastener is installed onto the nose rack by passing the insertion head of the fastener through the open hole of the nose rack. In other words, the simply structured insertion head alone holds the critical role of being a securing connector for the whole pair of eyeglasses, which can be very easily damaged by unexpected physical forces.

FIG. 8 shows a pair of conventional eyeglasses with a soft nose pad structure 2', including an eyeglasses frame 1', and vertical protruding pillars 11' around the position corresponding to the nose. Different insertion holes 21' corresponding to the vertical pillars 11' are informed in the soft nose pad structure 2'. The soft nose pad structure 2' is attached to the eyeglasses frame 1' by inserting vertical pillars 11' into corresponding insertion holes 21'.

Disadvantages associated with the prior art shown in FIG. 8 are two-folded. First of all, the angle (or opening) between the two wings of the soft nose pad structure 2' is not adjustable, and hence the eyeglasses are unable to fit different sizes and shapes of noses. Secondly, The nose pad structure 2' engages with the glasses frame 1' by insertion of vertical pillars 11' into insertion holes 21', which does not guarantee a secure attachment.

SUMMARY OF THE INVENTION

It is the goal of this invention to provide some feasible solutions for the defects encountered in the aforementioned prior arts. A pair of adjustable eyeglasses inevitably include two essential parts: the eyeglasses mainframe and the nose pad structure. It is an object of the present invention to provide a tool-free adjustable nose pad structure with an invisible connecting piece, which is firmly housed and completely concealed inside the eyeglasses mainframe for firmly securing the nose pad structure to the eyeglasses frame.

The present invention includes an eyeglasses mainframe and a nose pad structure. The eyeglasses frame is formed with specially configured grooves and openings for accommodating the retaining pillars on either side of the nose pad structure. The opening of the nose pad structure can be adjusted by various ways of contact between the retaining pillars and grooves, and also between the retaining pillars and openings with different sizes. Furthermore, the nose pad structured is firmly attached to the eyeglasses frame and opposes the gravitation force due to the size limitations upon the insertion pillars, grooves and openings.

BRIEF DESCRIPTION OF THE DRAWINGS

These and other features and advantages of this invention will become apparent in the following detailed description of the preferred embodiments of this invention, with reference to the accompanying drawings, in which:

FIG. 5 is a perspective assembly view of the first preferred embodiment, illustrating a larger opening between two wings of the nose pad structure;

DETAILED DESCRIPTION OF THE PREFERRED EMBODIMENT

Figure 1:
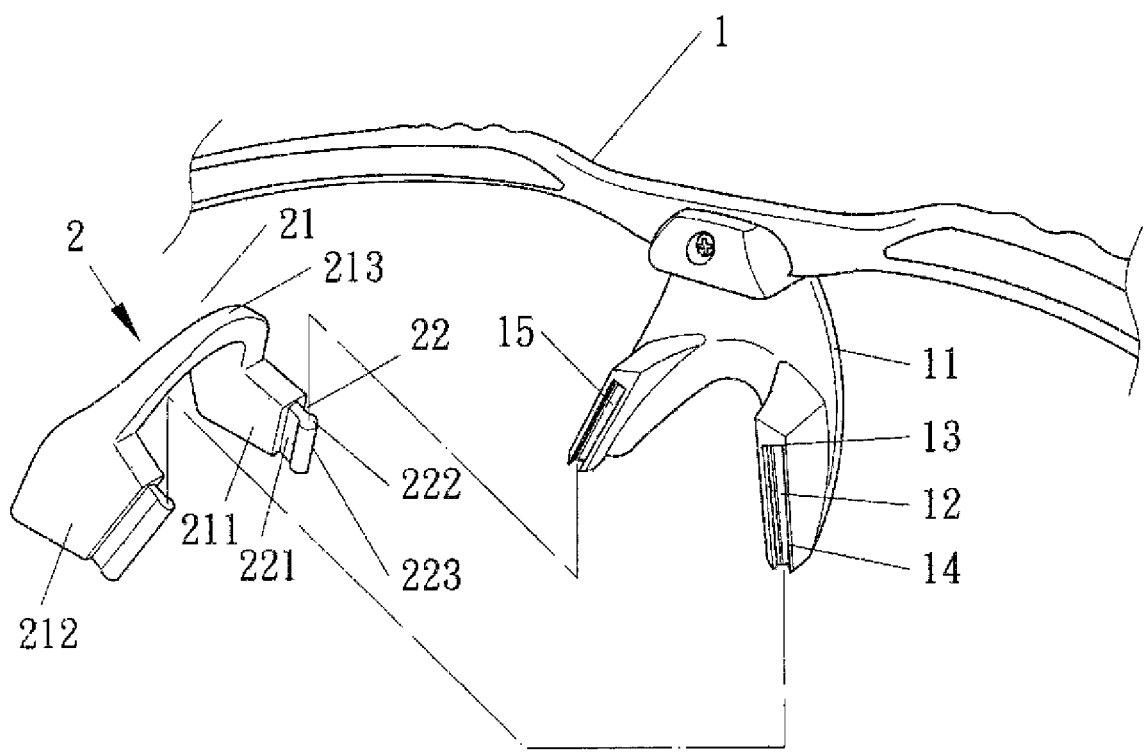
FIG. 1 is an exploded perspective view of the first preferred embodiment in accordance with the present invention.

Parts or elements referred to in the invention with symmetrical structure and identical function are designated by the same reference numerals throughout the entire disclosure.

Figure 2:
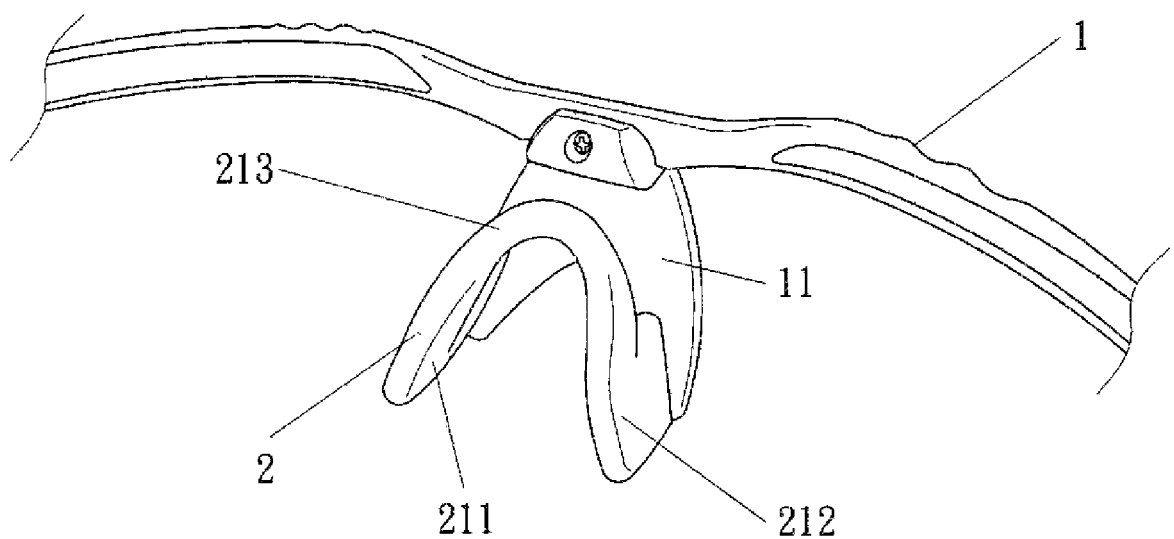
FIG. 2 is an assembly view of the first preferred embodiment shown in FIG. 1.
Figure 3:
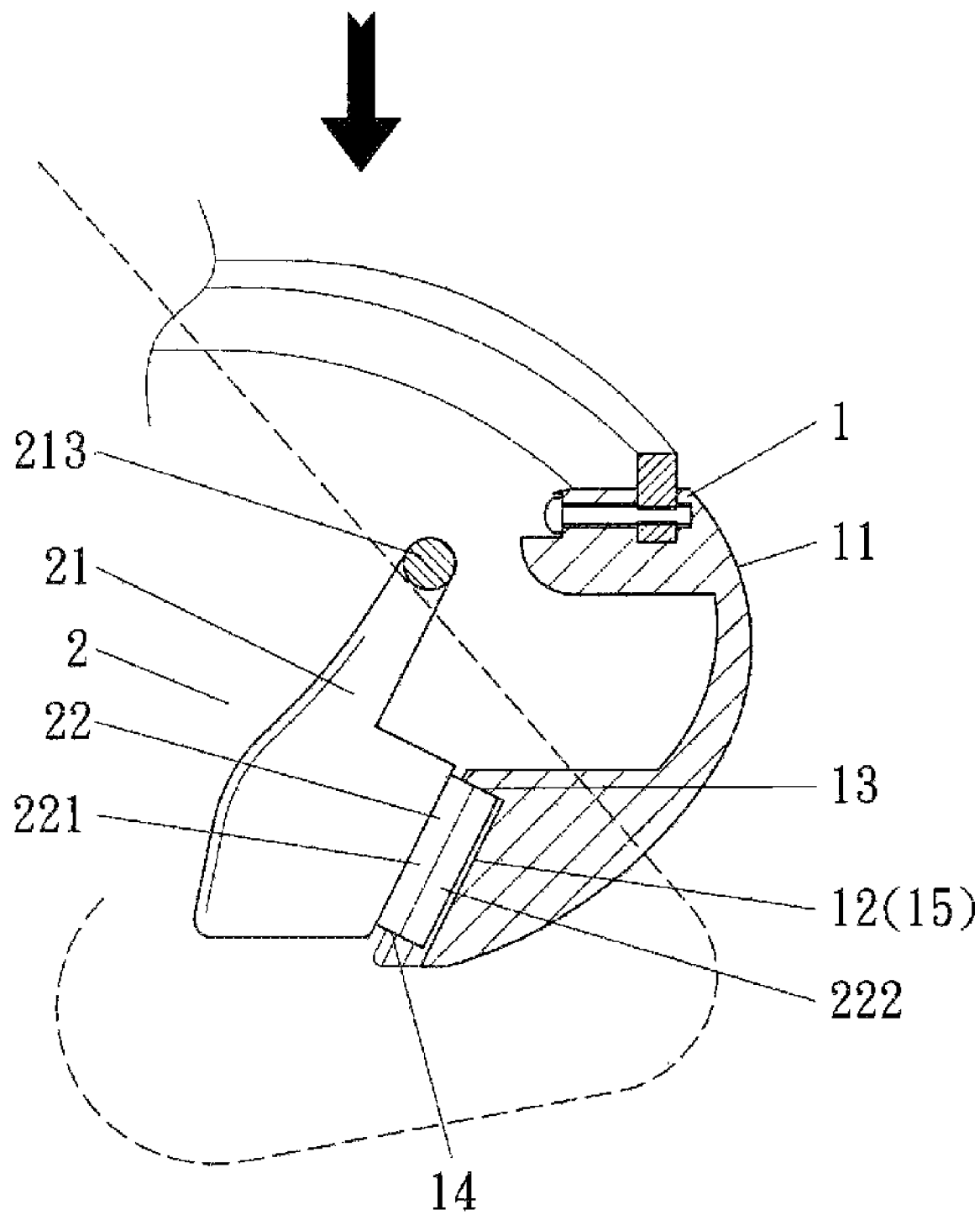
FIG. 3 is a cross-sectional assembly view of the first embodiment shown in FIG. 2.
Figure 4:
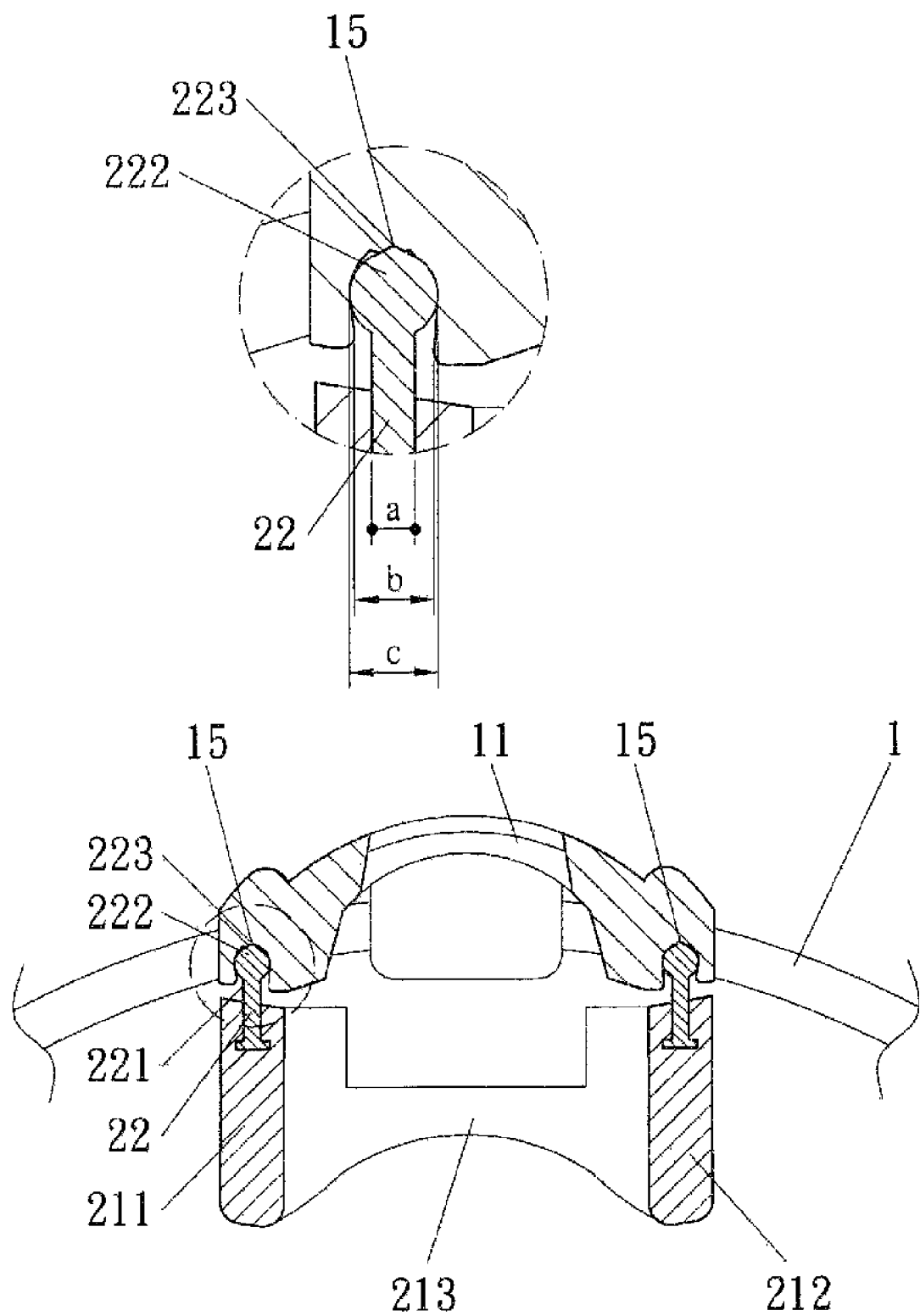
FIG. 4 is a cross-sectional assembly view of the first preferred embodiment, illustrating a smaller opening between two wings of the nose pad structure.

Referring to FIGS. 1-4, the first preferred embodiment of this invention includes two essential parts: an eyeglasses mainframe 1, and a nose pad structure 2. Disposed at a position corresponding to the nose of a wearer is the eyeglasses mainframe 1 made of hard materials, which includes in its middle a C-shape nose rack 11 with two wings extending downwards forming the C-opening: the left wing and the right wing. On either the right wing and the left wing of the nose rack 11, a lengthwise trough sleeve 12 protrudes outwards with an end hook-wall 13 at its very top. Referring to FIG. 1, within the lengthwise trough sleeve 12 is defined an upholding opening 14 which has a smaller opening on the top facing outwards than on the bottom contacting the nose rack 11. Referring to FIG. 4, inside the lengthwise trough sleeve 12 are formed a center groove 15, and a peripheral groove 15a, where the former joins the later by a limiting border-edge 16.

Different from the hard eyeglasses mainframe 1, the nose pad assembly 2 includes a bendable nose pad mainframe 21 made of soft materials, flanked on each side with an insertion base 211 and an insertion base 212. The insertion base 211 and 212 are connected by a curved center bridge 213 for securing on the nose of a wearer. At each of the insertion base 211 and 212 corresponding to the lengthwise trough sleeve 12 (located on the right wing and the left wing of the nose rack 11) is integrally formed an insertion piece 22. The insertion piece 22 further includes an insertion wedge 221 made of hard materials, and a retaining pillar 222 extending outwards therefrom for positioning inside the lengthwise trough sleeve 12. The protruding rim 223 is integrally formed with the retaining pillar 222 for insertion into the center groove 15 which is deep down inside the lengthwise trough sleeve 12.

Referring to FIG. 4, the width of the insertion wedge 221 is represented by a, the width of the upholding opening 14, by b, and the width (or the diameter) of the retaining pillar 222, by c. The size relationship among the above-referenced three elements (i.e. the insertion wedge 221, the upholding opening 14, and the retaining pillar 222) are configured in such a way that the value of a is smaller than that of b, and the value of b is smaller than that of c.

In assembly, the nose pad structure 2 is attached to the eyeglasses mainframe 1 by being inserted upwards from the lower end of the lengthwise trough sleeve 12. As discussed previously, the upholding opening 14 has a smaller opening at the side facing outwards than at the side contacting the nose rack 11 for securing the nose pad structure 2. The upholding opening 14 together with the top end hook-wall 13 prevent the nose pad structure 2 from slipping off the eyeglasses mainframe 1 by opposing the gravitation force of the eyeglasses, as shown in FIG. 3. After assembly, the protruding rim 223 (of the retaining pillar 222) is positioned inside the center groove 15 (of the lengthwise trough sleeve 12), and firmly secured by the delimiting border-edge 16, as depicted in FIG. 2 and FIG. 4 in which the angle (or opening) formed by the two insertion bases 211 and 212 does not reach its maximum.

Figure 6:
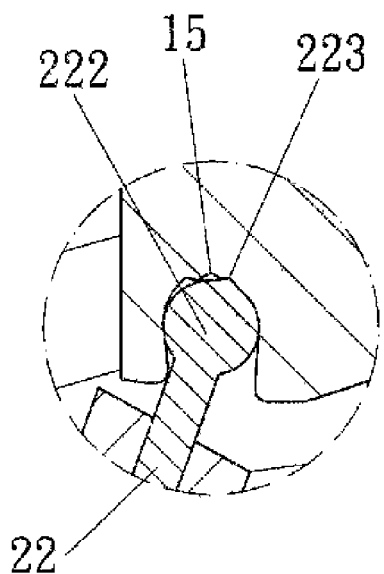
FIG. 6 a cross-sectional assembly view of the first preferred embodiment, illustrating a larger opening between two wings of the nose pad structure.
Figure 6:
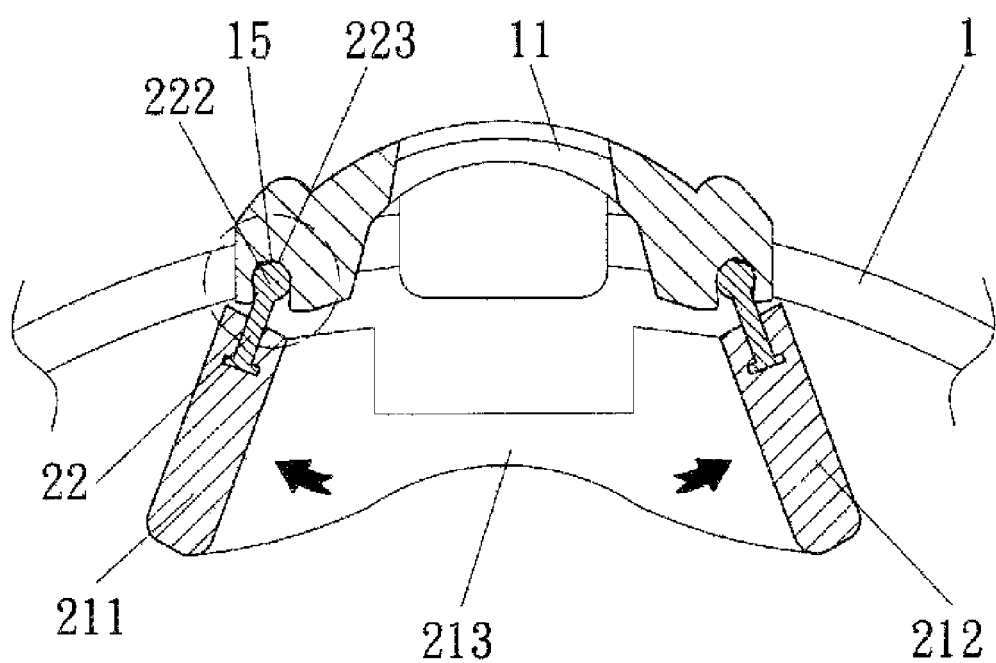

One advantage of this invention lies in the adjustable flexibility of the angle (or opening) between the two insertion bases 211 and 212, which is mainly contributed by the center groove 15 and the peripheral groove 15a. Referring to FIG. 5 and FIG. 6, the insertion piece 22 can also be positioned by resilience in such a way that the protruding rim 223 is inside the peripheral groove 15a (instead of the center groove 15, as shown in FIG. 4) and hence is in direct contact with the other side of the delimiting border-edge 16 (as opposed to what is shown in FIG. 4). It is this specific configuration that allows for multiple sizes of the angle (or opening) between the two insertion bases 211 and 212, which can better fit different sizes and shapes of individual noses.

Figure 7:
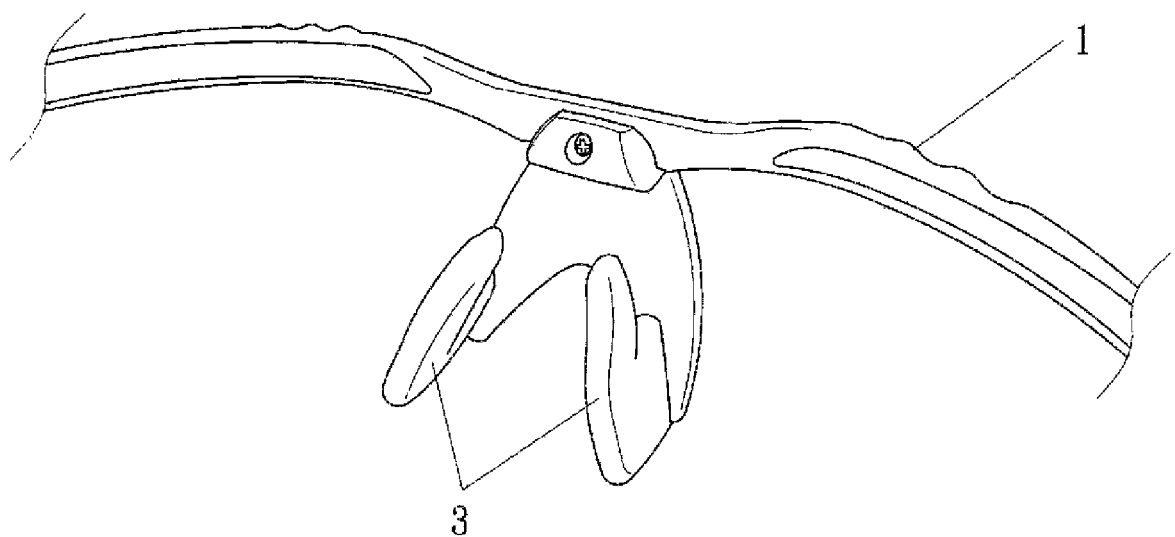
FIG. 7 is an assembly view of a second preferred embodiment in accordance with the present invention.
Figure 8:
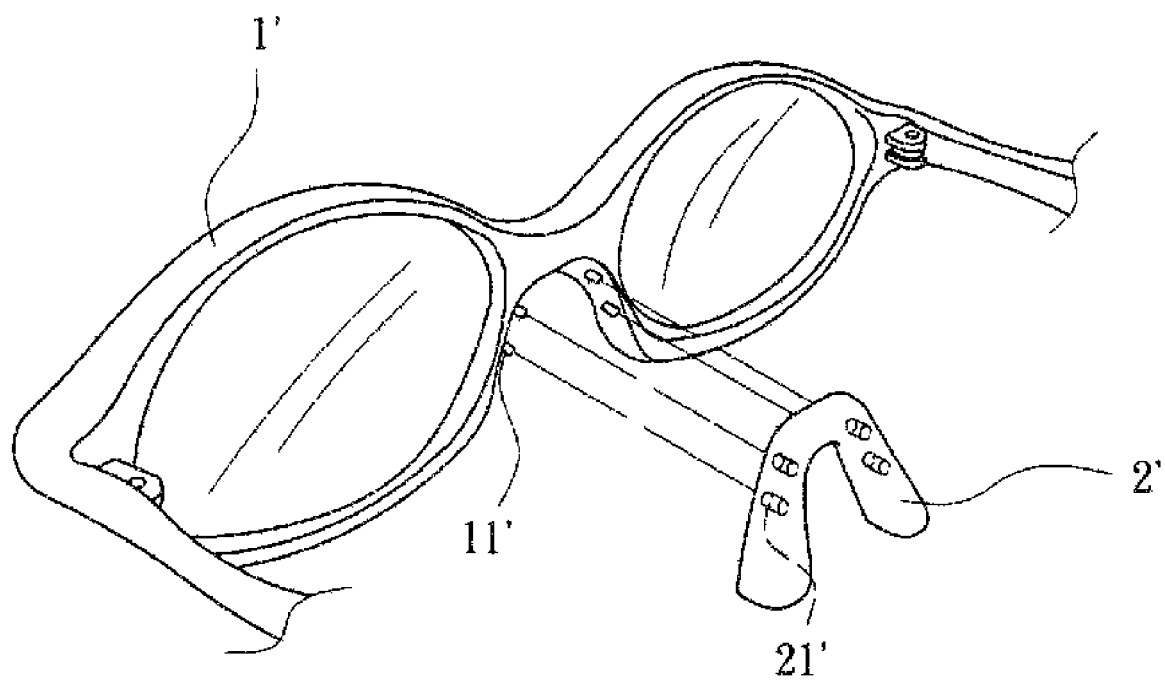
FIG. 8 is an exploded perspective view of a conventional pair of eyeglasses.

A second preferred embodiment in accordance with the present invention is shown in FIG. 7. Different from the nose pad structure 2 (of two connected insertion pieces 211 and 212) in the first embodiment, the nose pad assembly 3 in FIG. 7 includes two separated insertion bases 211 and 212; each is attached to the eyeglasses mainframe 1. The second preferred embodiment is also characterized with an adjustable angle (or opening) between the two separated insertion bases.

The insertion piece 22 in the present invention can also be conveniently integrally formed with the eyeglasses mainframe 1 of the same hard material, as long as the nose pad assembly is made of appropriate soft materials for bendable elasticity. In this case, the two distinguishing characteristics of the present invention still remain, the tool-free convenience and the adjustable flexibility.

While the present invention has been described in connection with the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A nose pad assembly of eyeglasses comprising
   an eyeglasses mainframe which includes a nose rack with two wings on either end thereof extending downwards forming an opening at a position corresponding to the nose, wherein each of said wings is formed with a lengthwise trough sleeve joins with a top end hook-wall, and said lengthwise trough sleeve further includes
   a center groove,
   a peripheral groove,
   a limiting border-edge which connects said center groove with said peripheral groove, and
   an upholding opening with a smaller opening on the side facing outwards than on the side contacting said nose rack; and
   a nose pad structure with an insertion piece on either end thereof for inserting into said lengthwise trough sleeve, wherein said insertion piece further includes
   an insertion wedge, and
   a retaining pillar extending outwards from said insertion edge and formed with a protruding rim for positioning in either said center groove or said peripheral groove in said lengthwise trough sleeve.

2. The nose pad assembly as claimed in claim 1, wherein said nose pad structure includes a bendable nose pad mainframe made of soft materials flanked on either side with said insertion piece, and each said insertion piece is made of hard materials.

3. The nose pad assembly as claimed in claim 1, wherein said nose pad structure includes a nose pad mainframe flanked on either side with an insertion base connecting to said insertion piece, and said insertion base connects to each other by a center bridge.

4. The nose pad assembly as claimed in claim 1, wherein said nose pad structure includes two unconnected insertion bases, wherein each of said unconnected insertion bases connects said insertion piece.

* * * * *